(12) United States Patent
Kim et al.

(10) Patent No.: US 12,475,298 B2
(45) Date of Patent: Nov. 18, 2025

(54) ROTATABLE DISPLAY APPARATUS AND CONTROL METHOD THEREOF

(71) Applicant: SAMSUNG ELECTRONICS CO., LTD., Suwon-si (KR)

(72) Inventors: Junggeun Kim, Suwon-si (KR); Changhoon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 67 days.

(21) Appl. No.: 18/244,635

(22) Filed: Sep. 11, 2023

(65) Prior Publication Data

US 2024/0111940 A1 Apr. 4, 2024

Related U.S. Application Data

(63) Continuation of application No. PCT/KR2023/009583, filed on Jul. 6, 2023.

(30) Foreign Application Priority Data

Oct. 4, 2022 (KR) ........................ 10-2022-0126596

(51) Int. Cl.
*G06F 40/106* (2020.01)
*G06F 40/14* (2020.01)

(52) U.S. Cl.
CPC ............ *G06F 40/106* (2020.01); *G06F 40/14* (2020.01)

(58) Field of Classification Search
CPC ...... G06F 40/106; G06F 40/14; G06F 40/143; G06F 2200/1614
See application file for complete search history.

(56) References Cited

U.S. PATENT DOCUMENTS 8,866,840 B2   10/2014   Dahl et al.
8,933,874 B2    1/2015   Lundqvist et al.
(Continued)

FOREIGN PATENT DOCUMENTS

JP    2009-53385 A    3/2009
JP    5277590 B2      8/2013
(Continued)

OTHER PUBLICATIONS

International Search Report (PCT/ISA/210) issued by the International Searching Authority on Oct. 23, 2023 in corresponding International Application No. PCT/KR2023/009583.
(Continued)

*Primary Examiner* — Asher D Kells
(74) *Attorney, Agent, or Firm* — Sughrue Mion, PLLC

(57) ABSTRACT

A display apparatus, includes: a display that is rotatable between a first position and a second position; a communicator configured to conduct internet communication; and at least one processor. The at least one processor is configured to, (i) in response to a user command for accessing a website being received through a web browser that is loaded in the display apparatus, identify an orientation of the display, the user command being based on a URL for a PC version of the website, and (ii) based on the identified orientation being the second position, attempt to receive a mobile version of the web page associated with a mobile version of the website from a server that provides the mobile version of the website based on a URL for the mobile version of the website, and attempt to display the received mobile version of the web page in the display.

17 Claims, 11 Drawing Sheets

(56) References Cited

U.S. PATENT DOCUMENTS

| | | | |
|---|---|---|---|
| 9,310,888 B2* | 4/2016 | Dickinson | G06F 3/04842 |
| 11,054,916 B2 | 7/2021 | Lee | |
| 11,586,298 B2 | 2/2023 | Lee | |
| 11,709,526 B2 | 7/2023 | Lee et al. | |
| 2004/0204130 A1* | 10/2004 | Khazaka | G06F 16/9577 |
| | | | 455/566 |
| 2010/0083163 A1* | 4/2010 | Maghoul | G06F 1/1626 |
| | | | 715/781 |
| 2010/0085382 A1 | 4/2010 | Lundqvist et al. | |
| 2011/0126141 A1 | 5/2011 | King et al. | |
| 2011/0216064 A1* | 9/2011 | Dahl | H04M 1/0247 |
| | | | 345/428 |
| 2012/0131441 A1* | 5/2012 | Jitkoff | G06Q 30/0641 |
| | | | 715/234 |
| 2013/0033523 A1* | 2/2013 | Stovicek | G06F 40/197 |
| | | | 345/649 |
| 2014/0053065 A1* | 2/2014 | Yun | G06F 16/9577 |
| | | | 715/238 |
| 2014/0101535 A1* | 4/2014 | Kim | G06F 3/04886 |
| | | | 715/761 |
| 2014/0223291 A1* | 8/2014 | Sharma | G06F 40/103 |
| | | | 715/238 |
| 2014/0250357 A1* | 9/2014 | Ryu | G06F 16/9577 |
| | | | 715/205 |
| 2014/0258870 A1* | 9/2014 | Gordon | G06F 1/1694 |
| | | | 715/733 |
| 2015/0039996 A1 | 2/2015 | Kwon | |
| 2018/0260093 A1* | 9/2018 | Barsness | G06F 3/0488 |
| 2020/0301518 A1 | 9/2020 | Lee | |
| 2021/0173439 A1 | 6/2021 | Lee et al. | |
| 2021/0286444 A1 | 9/2021 | Lee | |
| 2023/0333591 A1 | 10/2023 | Lee et al. | |

FOREIGN PATENT DOCUMENTS

| | | |
|---|---|---|
| KR | 10-2009-0070013 A | 7/2009 |
| KR | 10-2011-0120858 A | 11/2011 |
| KR | 10-2012-0020402 A | 3/2012 |
| KR | 10-1143458 B1 | 5/2012 |
| KR | 10-1269288 B1 | 5/2013 |
| KR | 10-1299670 B1 | 8/2013 |
| KR | 10-2020-0111437 A | 9/2020 |
| KR | 10-2021-0073280 A | 6/2021 |

OTHER PUBLICATIONS

Written Opinion (PCT/ISA/237) issued by the International Searching Authority on Oct. 23, 2023 in corresponding International Application No. PCT/KR2023/009583.

International Search Report (PCT/ISA/210) issued by the International Searching Authority on Oct. 20, 2023 in corresponding International Application No. PCT/KR2023/009583.

Written Opinion (PCT/ISA/237) issued by the International Searching Authority on Oct. 20, 2023 in corresponding International Application No. PCT/KR2023/009583.

* cited by examiner

ROTATABLE DISPLAY APPARATUS AND CONTROL METHOD THEREOF

CROSS-REFERENCE TO RELATED APPLICATION(S)

This application is a bypass continuation of International Application No. PCT/KR2023/009583, filed on Jul. 6, 2023, which is based on and claims priority to Korean Patent Application No. 10-2022-0126596, filed on Oct. 4, 2022, in the Korean Intellectual Property Office, the disclosures of which are incorporated by reference herein in their entireties.

TECHNICAL FIELD

The disclosure relates to a display apparatus and a control method thereof, and more particularly to a rotatable display apparatus and a control method thereof.

BACKGROUND

A conventional rotatable display apparatus may be installed on a wall surface or a support and may be rotated from a landscape position to a portrait position, or from a portrait position to a landscape position according to a user command.

In addition, many vertical format contents are being released recently and accordingly, an environment in which conventional display apparatuses can also use the vertical format (i.e., portrait position) has been formed.

However, web browsers loaded in the conventional rotatable display apparatuses (e.g., smart TVs) are inconvenient to use because it is not optimized for the vertical format.

SUMMARY

A display apparatus may include: a display that is rotatable between a first position and a second position; a communicator configured to conduct internet communication; and at least one processor. The at least one processor may be configured to in response to a user command for accessing a website being received through a web browser that is loaded in the display apparatus, identify an orientation of the display, the user command being based on a uniform resource locator (URL) for a personal computer (PC) version of the website. The at least one processor may be configured to, based on the identified orientation being the first position, receive a PC version of a web page associated with the PC version of the website from a server that provides the PC version of the website through the communicator based on the URL for the PC version of the website, and display the received PC version of the web page in the display through the web browser. The at least one processor may be configured to, based on the identified orientation being the second position, attempt to receive a mobile version of the web page associated with a mobile version of the website from a server that provides the mobile version of the website through the communicator based on a URL for the mobile version of the website, and attempt to display the received mobile version of the web page in the display through the web browser. The display apparatus may further include: a storage configured to pre-store URL information of websites that provide URL for mobile versions of the websites separately from URL for PC versions of the websites. The at least one processor may be further configured to, based on the identified orientation being the second position, identify whether the URL for the mobile version of the website corresponding to the user command is present in the pre-stored URL information, and based on the URL for the mobile version of the website corresponding to the user command being present in the pre-stored URL information, display the mobile version of the web page based on the URL for the mobile version of the website that is identified from the pre-stored URL information.

The at least one processor may be further configured to, based on the URL for the mobile version of the website corresponding to the user command not being present in the pre-stored URL information, receive the PC version of the web page from the server that provides the PC version of the website based on the URL for the PC version of the website, change a size of the received PC version of the web page based on a horizontal resolution of the display in the second position, and display the size changed PC version of the web page in the display in the second position through the web browser.

The at least one processor may be further configured to, based on the orientation of the display being changed from the first position to the second position while the received PC version of the web page is being displayed in the display through the web browser, receive the mobile version of the web page from the server that provides the mobile version of the website based on the URL for the mobile version of the website, and display the received mobile version of the web page in the display in the second position through the web browser.

The user command may include at least one from among a user command for executing the web browser, a user command for executing a URL input in an address window of the web browser, or a user command for selecting a hyperlink that is included in a web page that is displayed in the web browser.

The first position may be a landscape position. The second position may be a portrait position.

A control method of a display apparatus that includes a display that is rotatable between a first position and a second position may include: receiving a user command for accessing a website based on a uniform resource locator (URL) for a personal computer (PC) version of the website through a web browser that is loaded in the display apparatus; in response to the receiving the user command, identifying an orientation of the display; based on the identified orientation being the first position, receiving a PC version of a web page associated with the PC version of the website from a server that provides the PC version of the website based on a URL for the PC version of the website, and displaying the received PC version of the web page in the display through the web browser; and based on the identified orientation being the second position, attempting to receive a mobile version of the web page associated with a mobile version of the website from a server that provides the mobile version of the website based on a URL for the mobile version of the website, and attempting to display the received mobile version of the web page in the display through the web browser.

The display apparatus may further include: a storage configured to pre-store URL information of websites that provide URL for mobile versions of the websites separately from URL for PC versions of the websites. The attempting to display the received mobile version of the web page may include: based on the identified orientation being the second position, identifying whether the URL for the mobile version of the website corresponding to the user command is present in the pre-stored URL information; and based on the URL for the mobile version of the website corresponding to the user command being present in the pre-stored URL information, displaying the mobile version of the web page based on the URL for the mobile version of the website that is identified from the pre-stored URL information.

The method may further include, based on the URL for the mobile version of the website corresponding to the user command not being present in the pre-stored URL information, receiving the PC version of the web page from the server that provides the PC version of the website based on the URL for the PC version of the website, changing a size of the received PC version of the web page based on a horizontal resolution of the display in the second position, and displaying the size changed PC version of the web page in the display in the second position through the web browser.

The method may further include, based on the orientation of the display being changed from the first position to the second position while the received PC version of the web page is being displayed in the display through the web browser, receiving the mobile version of the web page from the server that provides the mobile version of the website based on the URL for the mobile version of the website, and displaying the received mobile version of the web page in the display in the second position through the web browser.

The user command may include at least one from among a user command for executing the web browser, a user command for executing a URL input to an address window of the web browser, or a user command for selecting a hyperlink that is included in a web page that is displayed in the web browser.

The first position may be a landscape position. The second position may be a portrait position.

A non-transitory computer-readable recording medium may be configured to store computer instructions for a display apparatus to perform a method when executed by a processor of the display apparatus. The method may include receiving a user command for accessing a website based on a uniform resource locator (URL) for a personal computer (PC) version of the website through a web browser that is loaded in the display apparatus; in response to the receiving the user command, identifying an orientation of the display; based on the identified orientation being the first position, receiving a PC version of a web page associated with the PC version of the website from a server that provides the PC version of the website based on a URL for the PC version of the website, and displaying the received PC version of the web page in the display through the web browser; and based on the identified orientation being the second position, attempting to receive a mobile version of the web page associated with a mobile version of the website from a server that provides the mobile version of the website based on a URL for the mobile version of the website, and attempting to display the received mobile version of the web page in the display through the web browser.

The display apparatus may further include: a storage configured to pre-store URL information of websites that provide URL for mobile versions of the websites separately from URL for PC versions of the websites. The attempting to display the received mobile version of the web page may include: based on the identified orientation being the second position, identifying whether the URL for the mobile version of the website corresponding to the user command is present in the pre-stored URL information; and based on the URL for the mobile version of the website corresponding to the user command being present in the pre-stored URL information, displaying the mobile version of the web page based on the URL for the mobile version of the website that is identified from the pre-stored URL information.

The method may further include, based on the URL for the mobile version of the website corresponding to the user command not being present in the pre-stored URL information, receiving the PC version of the web page from the server that provides the PC version of the website based on the URL for the PC version of the website, changing a size of the received PC version of the web page based on a horizontal resolution of the display in the second position, and displaying the size changed PC version of the web page in the display in the second position through the web browser.

The method further may further include, based on the orientation of the display being changed from the first position to the second position while the received PC version of the web page is being displayed in the display through the web browser, receiving the mobile version of the web page from the server that provides the mobile version of the website based on the URL for the mobile version of the website, and displaying the received mobile version of the web page in the display in the second position through the web browser.

The user command may include at least one from among a user command for executing the web browser, a user command for executing a URL input to an address window of the web browser, or a user command for selecting a hyperlink that is included in a web page that is displayed in the web browser.

The first position may be a landscape position. The second position may be a portrait position.

The display apparatus may further include a sensor. The at least one processor being configured to identify the orientation of the display may include being configured to receive sensor information from the sensor.

The identifying the orientation of the display may include receiving sensor information from a sensor.

BRIEF DESCRIPTION OF THE DRAWINGS

FIG. TA is a diagram illustrating a display apparatus in a portrait position according to one or more embodiments.

DETAILED DESCRIPTION

If it is determined that the detailed description of related known technologies may unnecessarily confuse the gist of the disclosed embodiments, the detailed description thereof will be omitted. In addition, redundant descriptions of same configurations will be omitted as much as possible.

Suffixes such as "part" for elements used in the description below have been added or used combined therewith considering its easiness in preparing the disclosure, and do not have meaning or role that distinguishes one another on its own.

Various terms have been used to describe one or more embodiments, and is not intended to limit the disclosed embodiments. A singular expression includes a plural expression, unless otherwise specified.

It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element). In contrast, when a certain element (e.g., first element) is indicated as "directly coupled with/to" or "directly connected to" another element (e.g., second element), it may be understood as the other element (e.g., third element) not being present between the certain element and the another element.

Terms used in the embodiments herein may be interpreted to a meaning commonly known to those of ordinary skill in the art, unless otherwise defined.

Figure 1A:
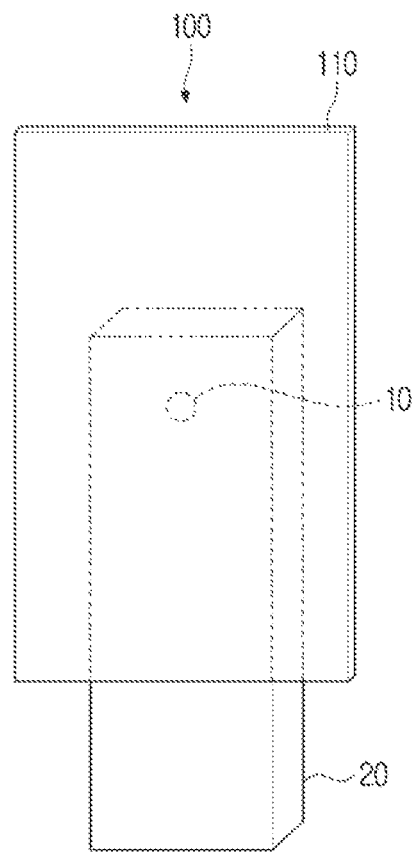
FIG. 1B is a diagram illustrating a rotation of a display apparatus according to one or more embodiments.
FIG. 1C is a diagram illustrating a display apparatus in a landscape position according to one or more embodiments.
Figure 1B:
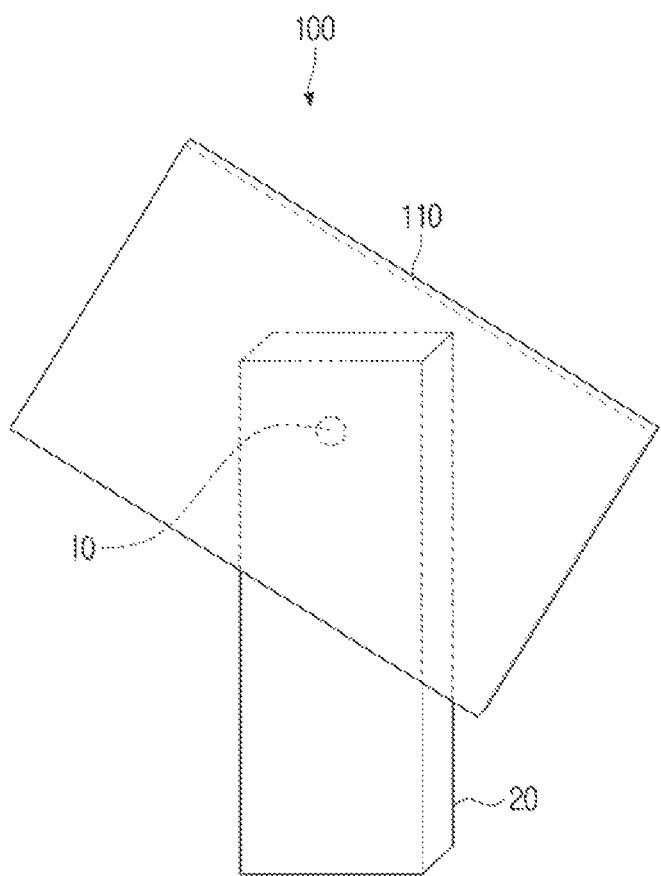
Figure 1C:
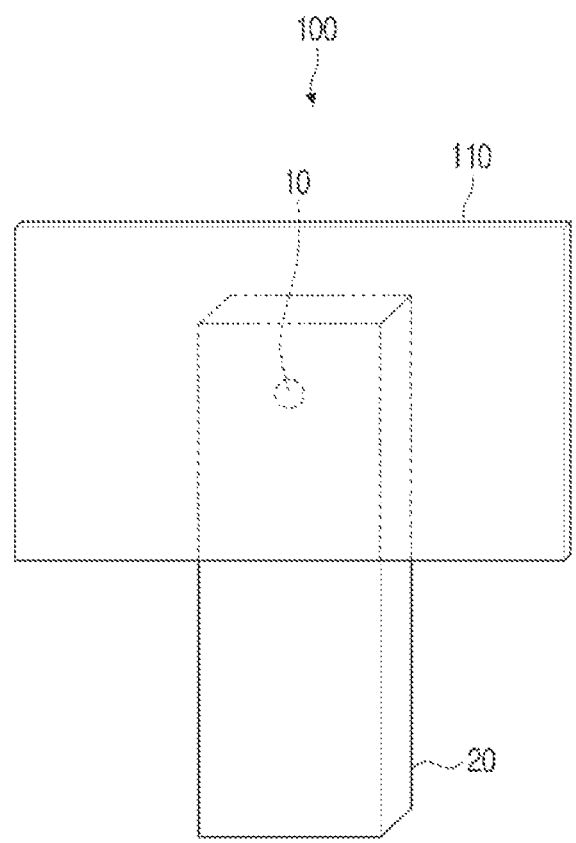

Various embodiments will be described in detail below with reference to the accompanied drawings. FIG. 1A to FIG. 1C are diagrams illustrating an image of a display apparatus rotating according to one or more embodiments.

A display apparatus 100 may be implemented in various display apparatuses such as, for example, and without limitation, a smart television (TV), a notebook, and an electronic frame. An example of when the display apparatus 100 is a smart TV will be described below. However, the above is not limited thereto.

Referring to FIG. 1A to FIG. 1C, a smart TV 100 may include a display 110 and a support 20 for supporting the display 110. The smart TV 100 may be implemented with the support 20.

When an event for rotating the display 110 occurs, the display 110 may be rotated. Here, the event for rotating the display 110 may be when a user command for rotating the display 110 is input, when a resolution of an image to be displayed is changed, or the like, but is not limited thereto.

For example, when a user physically rotates the display 110, it may also correspond to an event for rotating the display 110.

The display 110 may be rotated based on a rotational center 10 while a direction to which a front surface thereof faces is in a fixed state. Here, the front surface refers to a direction to which a screen of the display 110 faces.

The display 110 may be rotated between a portrait position (i.e., a vertical format, a vertical mode, or a vertical direction position) and a landscape position (i.e., a horizontal format, a horizontal mode, or a horizontal direction position).

Here, the portrait position may refer to a position that a vertical length of the display is disposed in a longer format than a horizontal length based on a ground surface, and the landscape position may refer to a position that a horizontal length thereof is disposed in a longer format than a vertical length based on the ground surface.

For example, if the user command for rotating the display 110 is input while the display 110 is in a state of the portrait position as shown in FIG. TA, the display apparatus 100 may rotate the display 110 in an anti-clockwise direction. In this case, the display 110 may be placed in the landscape position shown in FIG. 1C after being placed in a position as shown in FIG. 1B.

Alternatively, if the user command for rotating the display 110 is input while the display 110 is in a state of the landscape position as shown in FIG. 1C, the display apparatus 100 may rotate the display 110 in a clockwise direction. In this case, the display 110 may be placed in the portrait position shown in FIG. TA after being placed in the position as shown in FIG. 1B.

Embodiments of the display 110 rotating are not limited to those shown in FIG. 1A to FIG. 1C. For example, the display 110 may be placed in the landscape position by rotating from the portrait position in the clockwise direction, or placed in the portrait position by rotating from the landscape position in the anti-clockwise direction.

In addition, in the above, although examples of the display 110 rotating 90 degrees in the anti-clockwise direction or the clockwise direction to be placed in the portrait position or the landscape position have been provided as examples, the embodiments are not limited thereto. For example, the display 110 may rotate 90 degrees from the portrait position in the anti-clockwise direction or the clockwise direction to be placed in the landscape position, and further rotated 90 degrees from the landscape position in the same direction to be placed in the portrait position.

The smart TV 100 may be a multi-functional TV in which an internet access function is combined to a typical TV function that receives terrestrial broadcasting. The smart TV 100 may be referred to as an internet TV or a connected TV. Accordingly, a user may install various applications (or apps) in the smart TV 100 and utilize various functions in addition to a TV broadcast viewing.

For example, the user may install a web browser app in the smart TV 100, and user an internet service through the web browser. However, web browsers of the related art installed in the smart TVs 100 were not developed with the consideration of when the smart TV is used in the portrait position. Accordingly, when the web browser is used in the smart TV of the related art, there has been no problem when using the smart TV in the landscape position, but there has been a problem of a uniform resource locator (URL) in a PC version which is optimized in a horizontal direction being executed or displayed as is even in the portrait position.

Figure 2A:
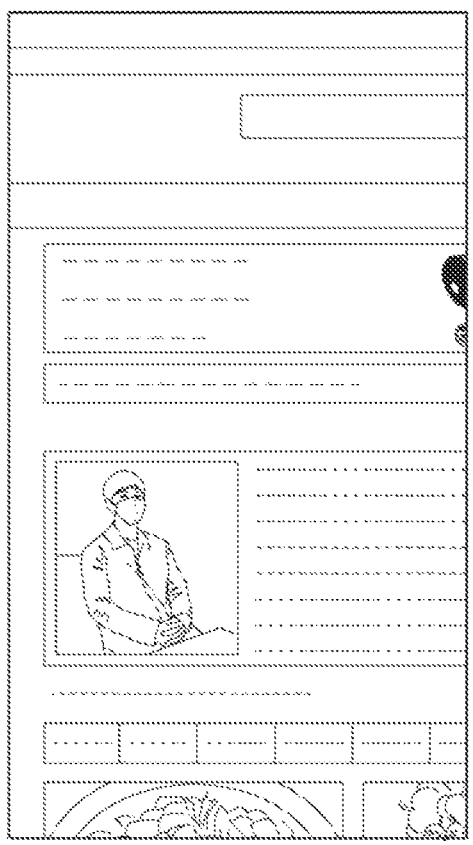
FIG. 2A is a diagram illustrating a web browser screen displayed in a display apparatus in a portrait position of the related art.
Figure 2B:
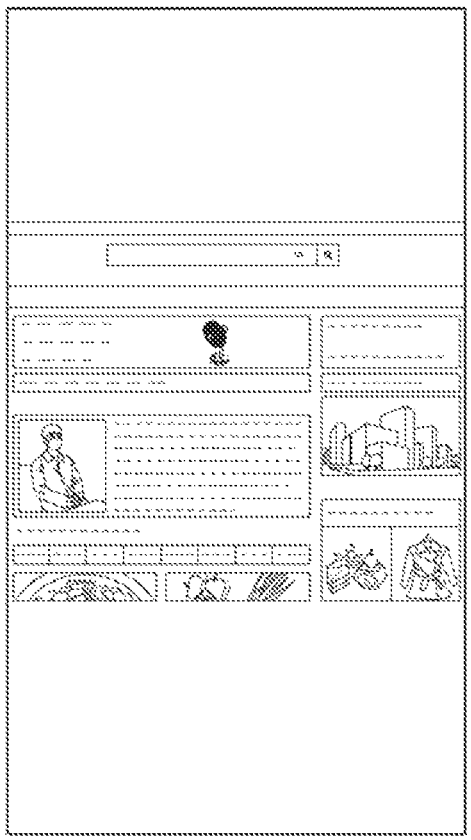
FIG. 2B is a diagram illustrating a web browser screen displayed in a display apparatus in a portrait position of the related art.

FIG. 2A and FIG. 2B show a web browser screen displayed in the smart TV in the portrait position of the related art. If a URL executing screen in the PC version is displayed as is while the smart TV is used in the portrait position as in the related art, a web page may be displayed with a left side thereof or a right side thereof cut as shown in FIG. 2A. In addition, if a size of the web page is downscaled to prevent a cutting of the left side thereof or the right side thereof as shown in FIG. 2B, texts will be displayed too small making it difficult to read.

Various embodiments will be described below to solve the problems as described above.

Figure 3:
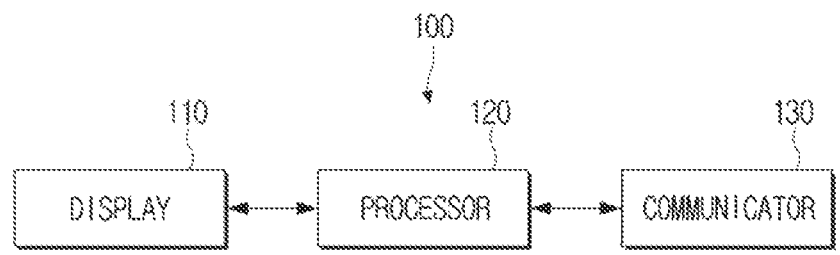
FIG. 3 is a block diagram illustrating a display apparatus according to one or more embodiments.

FIG. 3 is a block diagram illustrating a display apparatus according to one or more embodiments. Referring to FIG. 3, the display apparatus 100 may include the display 110, a processor 120, and a communicator 130.

The display 110 may display various images. Here, an image may be a concept that includes at least one from among a still image or a moving image, and the display 110 may display various images such as, for example, and without limitation, a broadcast content, a multi-media content, and a web page. In addition, the display 110 may display various user interfaces (UIs) and icons.

The display 110 may be rotated according to an operation of a motor. The display 110 may be rotated based on the rotational center 10 while the front surface thereof maintains a predetermined direction. Here, the rotational center 10 may be positioned at a geometric center of the display 110, but is not necessarily limited thereto, and may be positioned at another position of the display 110.

The display 110 may be rotated between a first position (e.g., landscape position) and a second position (e.g., portrait position).

As described above, the display 110 may be implemented in various forms such as, for example, and without limitation, a liquid crystal display (LCD) panel, a light emitting diode (LED), an organic light emitting diode (OLED), and a micro LED. In addition, the display 110 may be coupled with a touch panel and implemented as a touch screen.

The communicator 130 may perform communication with various electronic apparatuses according to communication methods of various types. Specifically, the communicator 130 may perform internet communication, and receive TV broadcast content.

To this end, the communicator 130 may include a wired or wireless local area network (LAN) communication module and a broadcast receiving module which receives TV broadcasts.

In addition, the communicator 130 may include a short-range wireless communication module (not shown) or a mobile communication module. Here, the short-range wireless communication module (not shown) may refer to a communication module that performs data communication wirelessly with an electronic apparatus positioned at short range such as, for example, and without limitation, a Bluetooth module, a ZigBee module, and a near field communication (NFC) module. In addition, the mobile communication module may refer to a communication module that performs communication by connecting to a mobile communication network according to various mobile communication standards such as, for example, and without limitation, 3rd Generation (3G), 3rd Generation Partnership Project (3GPP), and Long Term Evolution (LTE).

In addition, the communicator 130 may include at least one from among the wired communication modules (not shown) of, for example, a universal serial bus (USB), Institute of Electrical and Electronics Engineers (IEEE) 1394, and RS-232.

The processor 120 may control an overall operation of the display apparatus 100. The processor 120 may include at least one processor 120. For example, the processor 120 may include one or more of a central processing unit (CPU), an application processor (AP), or a communication processor (CP).

The processor 120 may operate an operating system or an application program and control hardware or software elements coupled to the processor 120, and perform various data processing and computations. In addition, the processor 120 may load commands or data received from at least one from among the other elements in the memory and process the received commands or data, and store the various data in a non-volatile memory.

Specifically, the processor 120 may receive a user command for accessing a website. The user command for accessing the website may be received through a web browser loaded in the display apparatus 100.

For example, a user command for executing a web browser may be a user command for accessing a website. The web browser may be set with a home page to be initially accessed when the web browser is executed. In this case, if the web browser is executed, an initial access to the set home page may be carried out. Accordingly, the user command for executing the web browser may be the user command for accessing the website corresponding to the set home page. Alternatively, a user command for executing a URL input to an address window of the executed web browser may be the user command for accessing a website. Alternatively, a user command of selecting a hyperlink included in a web page displayed in the web browser may be the user command for accessing a website.

The above-described URL of a home page, a URL input to an address window, and a URL of a website which is hyperlinked may all be URLs for a PC.

As described above, if the user command for accessing the website is received through the web browser loaded in the display apparatus 100, the processor 120 may identify a position of the display 110.

To this end, the display apparatus 100 may include at least one switch which is pressed when the display 110 is in the landscape position or the portrait position, and the processor 120 may identify a current position of the display 110 through the switch. A more detailed description thereof will be described below.

The processor 120 may receive, based on the identified position being the landscape position, a web page for PC from a server that provides the corresponding website through the communicator 130 based on the URL for PC received through the user command, and display the received web page for PC in the display 110 through the web browser.

In addition, the processor 120 may receive, based on the identified position being the portrait position, a web page for mobile from a server that provides the corresponding website through the communicator 130 based on a URL for mobile of a website, and display the received web page for mobile in the display 110 through the web browser.

Figure 4A:
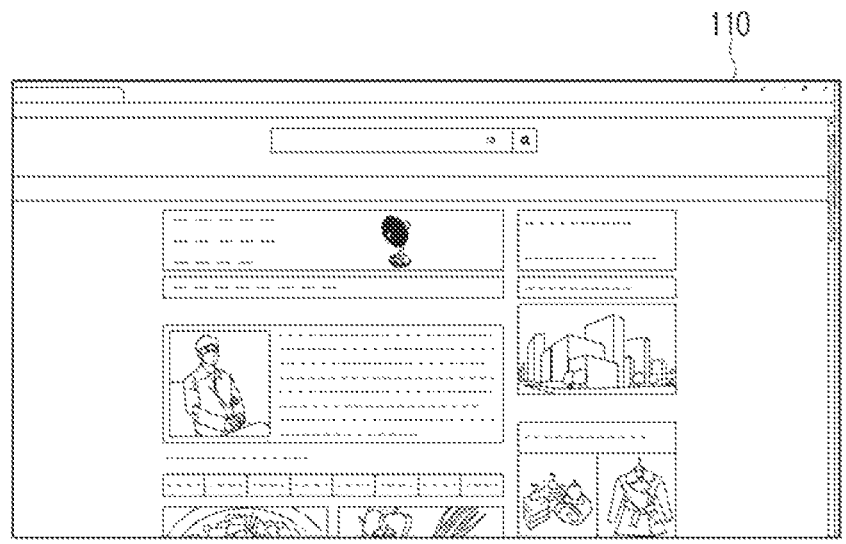
FIG. 4A is a diagram illustrating a web browser screen displayed in a display apparatus in a landscape position according to one or more embodiments.
Figure 4B:
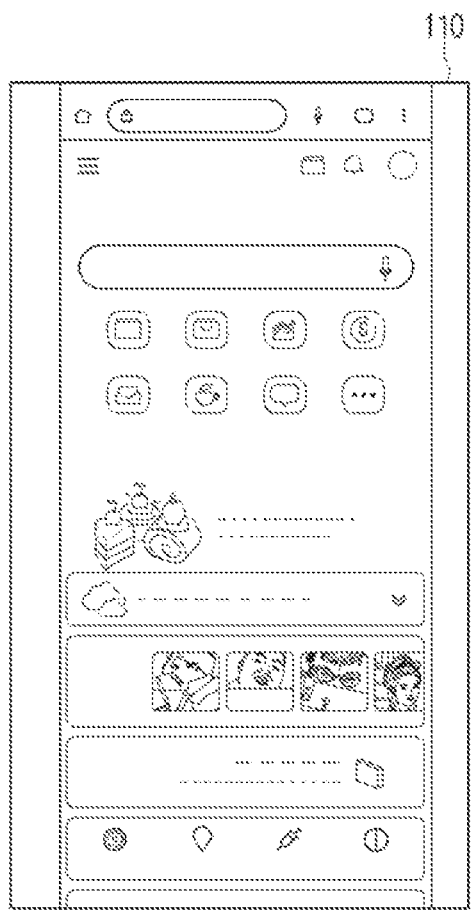
FIG. 4B is a diagram illustrating a web browser screen displayed in a display apparatus in a portrait position according to one or more embodiments.

FIG. 4A shows an example of a web page for PC of a specific website being displayed in the display 110 in the landscape position, and FIG. 4B shows an example of a web page for mobile of the same specific website being displayed in the display 110 in the portrait position.

Because the web page for PC is applied with a template suitable for a display form in which the horizontal length is longer than the vertical length, it may be suitable for being displayed in the display 110 in the landscape position as shown in FIG. 4A. In contrast, because the web page for mobile is applied with a template suitable for a display form in which the vertical length is longer than the horizontal length, it may be suitable for being displayed in the display 110 in the portrait position as shown in FIG. 4B.

Accordingly, as described above, a web page in a form suitable to a current position of the display 110 may be displayed through one web browser. Accordingly, when the web browser is used in the rotatable display apparatus 100, user usability may be increased.

Figure 5:
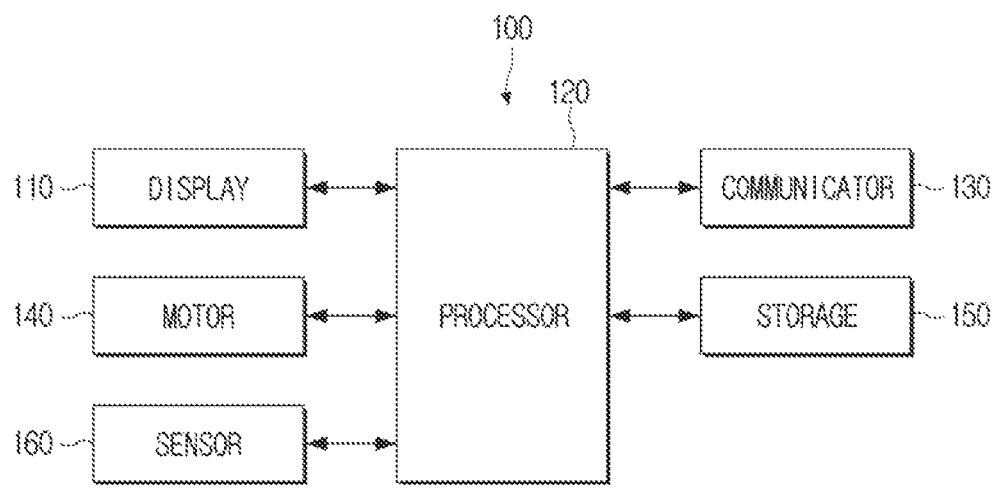
FIG. 5 is a block diagram illustrating a display apparatus according to one or more embodiments.

Various embodiments will be described in greater detail below with reference to FIG. 5. FIG. 5 is a block diagram illustrating the display apparatus 100 according to one or more embodiments. Referring to FIG. 5, the display apparatus 100 may include the display 110, the processor 120, the communicator 130, a motor 140, a storage 150, and a sensor 160. In describing FIG. 5, redundant descriptions of same configurations described above through FIG. 4 will be omitted.

The motor 140 may rotate the display 110. Specifically, the motor 140 may be connected to a gear (e.g., circular gear) coupled with the display 110, and rotate the display 110 by rotating the gear according to a control of the processor 120. To this end, the motor 140 may be implemented as a step motor capable of generating a rotational force, but this is merely one embodiment, and the motor 140 may be implemented as various motors such as, for example, and without limitation, an AC motor, and a DC motor.

The sensor 160 may sense a rotation state of the display 110. Specifically, the sensor 160 may sense a rotation of the display 110 coupled to the gear by sensing a rotation of the gear rotated by the motor 140.

To this end, the sensor 160 may include an encoder. The encoder may be a sensor that can sense a rotation direction, a rotation speed, and a rotation angle (or rotation position). An optical encoder may include an encoder wheel that includes light emitting devices (e.g., LEDs) and a plurality of slots (or holes), and light receiving devices (e.g., photo diodes).

Because a pulse is generated by a number of slots in an encoder wheel when the encoder wheel rotates by one revolution, a rotation angle per pulse may be known based on the number of slots in the encoder wheel and a gear ratio of the gear. Accordingly, the rotation angle or rotation speed of the display 110 may be calculated from the pulse of the encoder. In addition, by disposing at least two light emitting device and light receiving device set at a suitable position of the encoder wheel, a rotation direction of the display 110 may be sensed using a phase difference of a pulse generated in each set. In the above, an example of the encoder being an optical encoder has been provided, but a magnetic encoder which uses a magnet and a magnetic force sensing sensor or encoders of various different methods in addition thereto may be used in a rotation sensing of the display 110

For example, the rotation direction, speed, and angle of the display 110 may be used by the processor 120 to control a rotation operation of the display 110.

The sensor 160 may sense the current position of the display 110 and whether the rotation is complete. To this end, the senor 160 may include a switch. The switch may be a mechanical limit switch or an optical limit switch, but is not limited thereto.

For example, the sensor 160 may include a first switch which is pressed when the display 110 is in the landscape position and a second switch which is pressed when the display 110 is in the portrait position. Accordingly, the processor 120 may identify the current positon of the display 110 and whether rotation is complete by checking which of the switches was pressed from among the first switch and the second switch.

As described in the above, the current position of the display 110 may be used, based on a user command for accessing the website being received, in determining, by the processor 120, whether to operate based on the URL for PC or to operate based on the URL for mobile.

Whether the rotation of the display 110 is complete may be used for a purpose of stopping the motor 140 when the rotation is complete.

The storage 150 may store an operating system (OS) for controlling the overall operation of the display apparatus 100, or various programs and data associated with the various operations of the display apparatus 100.

Specifically, the storage 150 may store a web browser app. Accordingly, the processor 120 may execute, based on a user command for executing the web browser being received, the web browser app stored in the storage 150.

The storage 150 may store URL information of websites that provide the URL for mobile separately from the URL for PC.

In a website, there may be an adaptive website which creates a web page suited to each device using an independent template for each type of device that the PC, a mobile device, or the like connects to, and a reactive website which can respond to all devices with one template.

Because only one common URL is provided without differentiating between the URL for PC and the URL for mobile in the case of the reactive website, there is no URL for mobile present. In addition, there may be no URL for mobile present in a website that provides only a web page for PC even if it is an adaptive website.

Accordingly, URL information of a website that provides both the URL for PC corresponding to the web page for PC and the URL for mobile corresponding to the web page for mobile from among the adaptive websites may be stored in the storage 150 as the above-described URL information.

Table 1 below shows an example of the URL information stored in the storage 150. In Table 1, URL information of three websites being stored has been provided as an example, but the number of websites that are stored with the URL information may vary.

TABLE 1

| website | URL for PC | URL for mobile |
| --- | --- | --- |
| aaa | www[dot]aaa[dot]com | m[dot]aaa[dot]com |
| BBB | www[dot]BBB[dot]com | mobile[dot]BBB[dot]com |
| abcd | www[dot]abcd[dot]com | m[dot]abcd[dot]com |

Referring to Table 1, aaa, BBB, and abcd are all adaptive websites that provide the URL for PC and the URL for mobile.

Websites that provide the URL for mobile separately from the URL for PC may be listed up in advance by a developer or manufacturer of the display apparatus 100 in a design or manufacturing step of the display apparatus 100, and the URL information for the corresponding websites may be stored in advance in the storage 150.

The URL information for all websites that provide the URL for mobile is not stored, and websites that provide web pages for mobile of a configuration suitable to a resolution of the display 110 in the portrait position may be selected, and the URL information of the selected websites as described may be stored in the storage 150. The above is because there are also websites that provide web pages for mobile that has a configuration not suitable to be displayed in the display 110 in the portrait position even from among the websites that provide the web pages for mobile.

That is, from among the adaptive websites that provide the URL for mobile separately from the URL for PC, the URL information of the websites that provide the web pages for mobile of a configuration suitable to the display 110 in the portrait position may be selected in advance and stored in the storage 150.

To this end, the storage 150 may include a volatile memory such as a dynamic random access memory (DRAM) and a static RAM (SRAM), and a non-volatile memory such as an erasable and programmable read only memory (EEPROM) which can maintain information even when power is in a turned-off state, and a flash memory. In addition, the storage 150 may include, for example, a hard disk drive (HDD), a solid state drive (SSD), and a memory card (e.g., a secure digital (SD) card, a memory stick) attachable to or detachable from the display apparatus 100.

The processor 120 may control the overall operation of the display apparatus 100.

Specifically, the processor 120 may identify, based on a user command for accessing a website (e.g., aaa) being received through a web browser based on a URL for PC (e.g., www[dot]aaa[dot]com in Table 1), the position of the display through the sensor 160 (specifically, a switch). Here, the user commands for accessing a website is as described above.

If the identified position is the landscape position, the processor 120 may receive a web page for PC from the server that provides the corresponding website based on a URL for PC (www[dot]aaa[dot]com in the above example) of a website (aaa in the above example) corresponding to a user command, and display the received web page for PC in the display 110 through the web browser.

If the identified position is the portrait position, the processor 120 may receive a web page for mobile from the server that provides the corresponding website based on a URL for mobile (m[dot]aaa[dot]com in the above example) of a website (aaa in the above example) corresponding to a user command, and display the received web page for mobile in the display 110 through the web browser.

Specifically, the processor 120 may identify, based on the identified position being the portrait position, whether the URL for mobile of the website (aaa in the above example) corresponding to the user command is present in the URL information (Table 1 in the above example) pre-stored in the storage 150.

Because the URL for mobile of aaa site (i.e., m[dot]aaa[dot]com) is present in Table 1, the processor 120 may receive the web page for mobile from the server that provides the corresponding website based on the URL for mobile (m[dot]aaa[dot]com in the above example) identified from the pre-stored URL information, and display the received web page for mobile in the display 110 through the web browser.

For example, while the display 110 is in the portrait position, when a user command for accessing a ccc website is received based on a URL for PC (e.g., www[dot]ccc[dot]com), the URL for mobile of the ccc site is not present in the URL information (Table 1 in the above example) pre-stored in the storage 150.

In this case, the processor 120 may receive a web page for PC from the server that provides the ccc website based on the URL for PC of the website (i.e., www[dot]ccc[dot]com). The processor 120 may change a size of the received web page for PC based on a horizontal resolution of the display 110 in the portrait position rather than displaying the received web page for PC as is in the display 110 in the portrait position, and display the size changed web page for PC through the web browser.

For example, the processor 120 may display the size of the received web page for PC by downscaling to a size of which a horizontal scroll bar is not generated when displayed in the display 110 in the portrait position, but the embodiment is not limited thereto.

The processor 120 may receive, based on the position of the display 110 being changed to the portrait position while the received web page for PC is being displayed in the display 110 in the landscape position through the web browser, a web page for mobile from the server that provides the corresponding website based on the URL for mobile of the same website, and display the received web page for mobile in the display 110 in the portrait position through the web browser.

Specifically, if the position of the display 110 is changed to the portrait position while the web page for PC of a specific website is being displayed in the display 110 in the landscape position through the web browser, the processor 120 may sense the above through the sensor 160. Accordingly, the processor 120 may identify whether the URL for mobile of the specific website is present in the URL information pre-stored in the storage 150, and if present, display the web page for mobile of the specific website based on the identified URL for mobile.

The above is the same vice versa. That is, if the position of the display 110 is changed to the landscape position while the web page for mobile of the specific website is being displayed in the display 110 of the portrait position through the web browser, the processor 120 may sense the position of the display having been changed to the landscape position through the sensor 160. Accordingly, the processor 120 may receive the web page for PC from the server that provides the corresponding website based on the URL for PC of the same website, and display the received web page for PC in the display 110 in the landscape position through the web browser.

Although not shown in the drawings, the display apparatus 100 may include a user inputter configured to receive input of various user commands for controlling an operation of the display apparatus 100.

For example, various user commands such as a user command for rotating the display 110, a user command for executing a web browser, and a user command for accessing a website may be input through the user inputter, and the processor 120 may perform various operations according to the user command input through the user inputter.

To this end, the user inputter may be implemented in various input devices such as, for example, and without limitation, various buttons, a touch sensor, or the like. In addition, because the user command can be received through an external remote controller, the user inputter may include a remote controller signal receiver.

Figure 6:
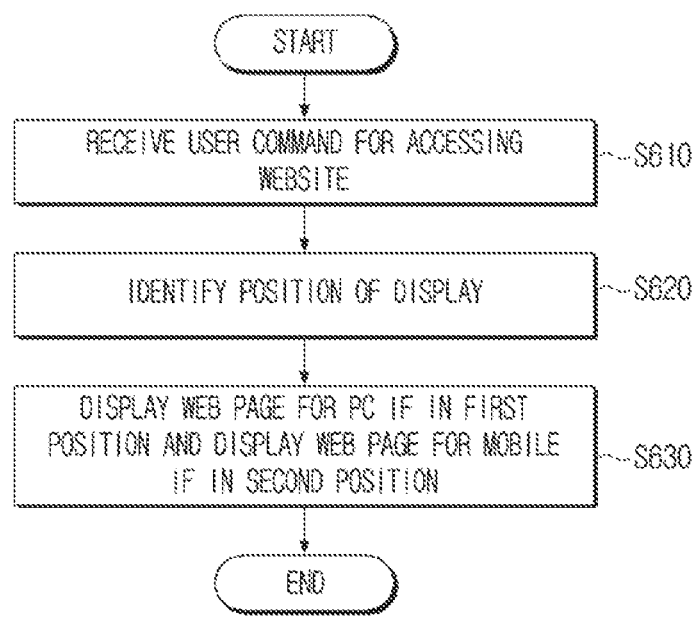
FIG. 6 is a flowchart illustrating a control method of a display apparatus according to one or more embodiments.

FIG. 6 is a flowchart illustrating a control method of the display apparatus 100 according to one or more embodiments.

Referring to FIG. 6, the display apparatus 100 may receive a user command for accessing a website (S610). Specifically, the display apparatus 100 may receive the user command for accessing the website through a web browser loaded in the display apparatus 100 based on a URL for PC of the website.

The user command for accessing the website may include at least one from among a user command for executing a web browser, a user command for executing a URL input in the address window of the web browser, or a user command selecting a hyperlink included in a web page displayed in the web browser.

As described above, if the user command for accessing the website is received, the display apparatus 100 may identify the positon of the display 110 (S620). Specifically, the display apparatus 100 may identify the position of the display 110 through the sensor 160 which can sense the position of the display 110. A detailed description thereof is as described above.

Accordingly, the display apparatus 100 may display a web page for PC if the identified position is in the first position, and display the web page for mobile if the identified position is in the second position (S630). The first position may be the landscape position, and the second position may be the portrait position.

Specifically, the display apparatus 100 may receive, based on the identified position being the landscape position, a web page for PC from the server that provides the corresponding website based on the URL for PC of the website corresponding to the user command, and display the received web page for PC in the display 110 through the web browser.

In addition, the display apparatus 100 may receive, based on the identified position being the portrait position, a web page for mobile from the server that provides the corresponding website based on the URL for mobile of the website corresponding to the user command, and display the received web page for mobile in the display 110 through the web browser.

For example, the display apparatus 100 may include the storage 150 that pre-stores the URL information of the websites that provide the URL for mobile separately from the URL for PC.

Accordingly, the display apparatus 100 may identify, based on the identified position being the portrait position, whether the URL for mobile of the website corresponding to the user command is present in the URL information pre-stored in the storage 150, and if present, display the web page for mobile based on the URL for mobile identified from the pre-stored URL information.

If the URL for mobile of the website corresponding to the user command is not present in the pre-stored URL information, the display apparatus 100 may receive a web page for PC from the server based on the URL for PC of the corresponding website. Accordingly, the display apparatus 100 may change the size of the received web page for PC based on the horizontal resolution of the display 110 in the portrait position, and display the size changed web page for PC in the display 110 in the portrait position through the web browser.

The display apparatus 100 may receive, based on the position of the display 110 being changed to the portrait position while the web page for PC of a specific website is being displayed in the display 110 in the landscape position through the web browser, a web page for mobile from the server based on the URL for mobile of the specific website, and display the received web page for mobile in the display 110 in the portrait position through the web browser.

Figure 7:
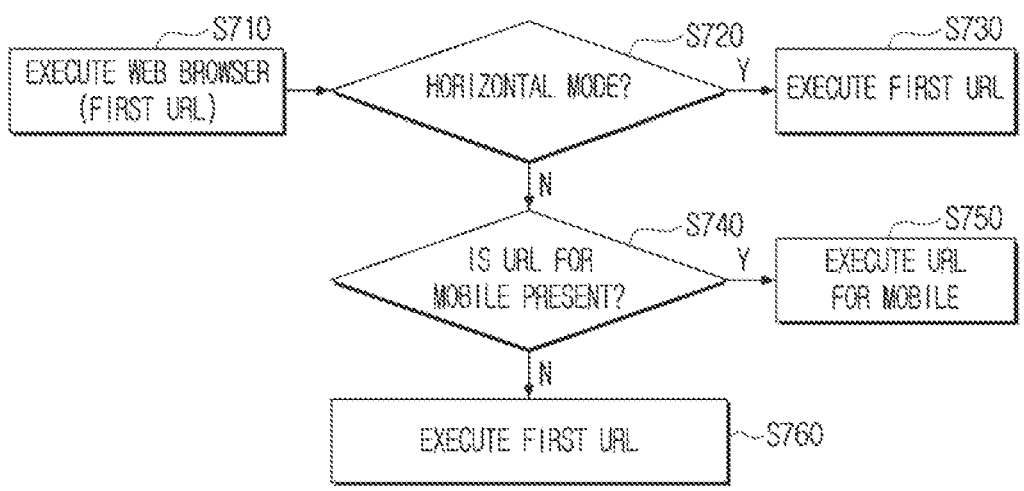
FIG. 7 is a diagram illustrating an operation of a display apparatus according to one or more embodiments.

FIG. 7 is a diagram illustrating various operations of the display apparatus 100 according to one or more embodiments.

Referring to FIG. 7, the web browser may be executed in the display apparatus 100, and the user command for accessing the website based on a first URL may be input in the display apparatus 100 (S710). The first URL may be the URL for PC, or may be a common URL. The common URL may refer to a URL provided from the reactive website.

First, the first URL being the URL for PC will be described.

When the user command for accessing the website is input based on the URL for PC, if the display apparatus 100 is in the horizontal mode (S720, Y), the display apparatus 100 may execute the URL for PC through the web browser (S730).

If, the display apparatus 100 is not in the horizontal mode (S720, N), that is, if it is in the vertical mode, the display apparatus 100 may check whether the URL for mobile of the website corresponding to the input URL for PC is present in the pre-stored URL information (S740), and if present (S740, Y), execute the URL for mobile through the web browser (S750).

If, the URL for mobile is not present in the pre-stored URL information while in the vertical mode state (S740, N), the display apparatus 100 may execute the input URL for PC through the web browser (S760). Because the web page for PC that is displayed according to an execution of the URL for PC is optimized to the horizontal mode, the display apparatus 100 may display the web page for PC by changing the size to suit the vertical mode and not display as is in the display apparatus 100 in the vertical mode.

The first URL being the common URL will be described below.

When the user command for accessing the website is input based on the common URL, if the display apparatus 100 is in the horizontal mode (S720, Y), the display apparatus 100 may execute the common URL through the web browser (S730).

In the case of a reactive web, because a layout is changed and displayed to suit a resolution of a device through techniques such as a fluid grid, flexible images, and media query, when the common URL is executed in the horizontal mode, the corresponding web page may be suitably displayed to suit the resolution of the display apparatus 100 in the horizontal mode.

If the display apparatus 100 is not in the horizontal mode (S720, N), that is, if it is in the vertical mode, the display apparatus 100 may check whether the URL for mobile of the website corresponding to the input common URL is present in the pre-stored URL information (S740). Because the common URL is not the URL for mobile, the URL for mobile may not be present in the pre-stored URL information (S740, N).

Accordingly, the display apparatus 100 may execute the common URL through the web browser (S760). Because the reactive web as described above is displayed in the web browser with the layout changed to suit the resolution of the device, even if the common URL is executed in the vertical mode, the corresponding web page may be suitable displayed to suit the resolution of the display apparatus 100 in the vertical mode.

In the above, to display the web page for mobile in the display 110 in the portrait position, embodiments of storing the URL information of pre-selected websites in the storage 150, and displaying the web page for mobile based therefrom have been described.

However, the embodiments are not limited thereto. For example, using user agent information, the web page for mobile may be made to be displayed in the display 110 in the portrait position.

Specifically, the processor 120 may identify, based on the user command for accessing the website being received based on the URL for PC, the position of the display 110. If the identified position is the portrait position, the processor 120 may transmit the user agent information that shows that the current device is a mobile device to the server that provides a website based on the URL for PC of the website. The server may transmit the web page for mobile to the display apparatus 100 based on the user agent information, and the display apparatus 100 may receive the above and display the web page for mobile.

In this case, there is no need to check and select the website that provides the URL for mobile in advance and store as the URL information, and there is no need for the processor 120 to identify the URL for mobile from the pre-stored information as described above. However, even the web page for mobile of a configuration which is not suitable to be displayed in the display 110 in the portrait position may all be displayed as the web page for mobile.

As described above, in using the display apparatus 100 which includes the rotatable display 110, a web page in a form suitable to the current position of the display 110 may be displayed through one web browser. Accordingly, user usability may be increased.

One or more embodiments may be implemented with software including instructions stored in a machine-readable storage media (e.g., computer). The machine may call an instruction stored in the storage medium, and as a device operable according to the called instruction, may include the display apparatus 100.

Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

A method may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, respective elements (e.g., a module or a program) may be formed of a single entity or a plurality of entities, and some sub-elements of the above-mentioned sub-elements may be omitted or other sub-elements may be further included in the various embodiments. Alternatively or additionally, some elements (e.g., modules or programs) may be integrated into one entity to perform the same or similar functions performed by the respective corresponding elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

The description above is merely an example of the technical concept of the disclosed embodiments, and various modifications and changes may be made by those of ordinary skill in the art to which the disclosed embodiments pertain without departing from the true spirit and full scope of the disclosed embodiments. In addition, the embodiments are intended to illustrative of the technical concept, and not limiting, and the scope of the technical concept is not limited by the one or more embodiments provided above. Accordingly, the scope of protection is to be interpreted by the appended claims, and all technical concepts within the equivalent scope thereof is to be interpreted as included within the scope of protection.

What is claimed is:

1. A display apparatus, comprising:
   a display that is rotatable between a first position and a second position;
   a communicator configured to conduct internet communication;
   a storage configured to pre-store uniform resource locator (URL) information in a table comprising URLs for mobile versions of websites and URLs for personal computer (PC) versions of the websites; and
   at least one processor configured to,
      in response to a user command for accessing a website being received through a web browser that is loaded in the display apparatus, identify an orientation of the display,
      based on the identified orientation being the first position,
         receive a PC version of a web page associated with the PC version of the website from a server that provides the PC version of the website through the communicator based on the URL for the PC version of the website, and
         display the received PC version of the web page in the display through the web browser,
      based on the URL for the mobile version of the website corresponding to the user command being present in the pre-stored URL information and the identified orientation being the second position,
         receive a mobile version of the web page associated with a mobile version of the website from a server that provides the mobile version of the website through the communicator based on a URL for the mobile version of the website stored in the table in association with the URL for the PC version of the website, and
         display the received mobile version of the web page in the display through the web browser, and
      based on the URL for the mobile version of the website corresponding to the user command not being present in the pre-stored URL information and the identified orientation being the second position:
         receive the PC version of the web page from the server that provides the PC version of the website based on the URL for the PC version of the website,
         change a size of scale of the received PC version of the web page based on a horizontal resolution of the display in the second position, and display the size changed scaled PC version of the web page in the display in the second position through the web browser.

2. The display apparatus of claim 1,
wherein the at least one processor is further configured to based on the identified orientation being the second position, identify whether the URL for the mobile version of the website corresponding to the user command is present in the pre-stored URL information.

3. The display apparatus of claim 1, wherein the at least one processor is further configured to, based on the orientation of the display being changed from the first position to the second position while the received PC version of the web page is being displayed in the display through the web browser,
receive the mobile version of the web page from the server that provides the mobile version of the website based on the URL for the mobile version of the website, and
display the received mobile version of the web page in the display in the second position through the web browser.

4. The display apparatus of claim 1, wherein the user command comprises
at least one from among a user command for executing the web browser, a user command for executing a URL input in an address window of the web browser, or a user command for selecting a hyperlink that is included in a web page that is displayed in the web browser.

5. The display apparatus of claim 1,
wherein the first position is a landscape position, and
wherein the second position is a portrait position.

6. A control method of a display apparatus that includes a storage and a display that is rotatable between a first position and a second position, the method comprising:
providing, in the storage, a table including pre-stored uniform resource locator (URL) information comprising URLs for mobile versions of websites and URLs for personal computer (PC) versions of the websites; and
receiving a user command for accessing a website through a web browser that is loaded in the display apparatus;
in response to the receiving the user command, identifying an orientation of the display;
based on the identified orientation being the first position, receiving a PC version of a web page associated with the PC version of the website from a server that provides the PC version of the website based on a URL for the PC version of the website, and
displaying the received PC version of the web page in the display through the web browser;
based on the URL for the mobile version of the website corresponding to the user command being present in the pre-stored URL information and the identified orientation being the second position,
receiving a mobile version of the web page associated with a mobile version of the website from a server that provides the mobile version of the website based on a URL for the mobile version of the website stored in the table in association with the URL for the PC version of the website, and
displaying the received mobile version of the web page in the display through the web browser; and
based on the URL for the mobile version of the website corresponding to the user command not being present in the pre-stored URL information and the identified orientation being the second position:

receiving the PC version of the web page from the server that provides the PC version of the website based on the URL for the PC version of the website,
changing a size of scale of the received PC version of the web page based on a horizontal resolution of the display in the second position, and
displaying the size changed scaled PC version of the web page in the display in the second position through the web browser.

7. The method of claim 6, further comprising
based on the identified orientation being the second position, identifying whether the URL for the mobile version of the website corresponding to the user command is present in the pre-stored URL information.

8. The method of claim 6, further comprising, based on the orientation of the display being changed from the first position to the second position while the received PC version of the web page is being displayed in the display through the web browser,
receiving the mobile version of the web page from the server that provides the mobile version of the website based on the URL for the mobile version of the website, and
displaying the received mobile version of the web page in the display in the second position through the web browser.

9. The method of claim 6, wherein the user command includes
at least one from among a user command for executing the web browser, a user command for executing a URL input to an address window of the web browser, or a user command for selecting a hyperlink that is included in a web page that is displayed in the web browser.

10. The method of claim 6,
wherein the first position is a landscape position, and
wherein the second position is a portrait position.

11. A non-transitory computer-readable recording medium configured to store computer instructions for a display apparatus to perform a method when executed by a processor of the display apparatus, the method comprising:
providing, in a storage of the display apparatus, a table including pre-stored uniform resource locator (URL) information comprising URLs for mobile versions of websites and URLs for personal computer (PC) versions of the websites; and
receiving a user command for accessing a website through a web browser that is loaded in the display apparatus;
in response to the receiving the user command, identifying an orientation of a display of the display apparatus that is rotatable between a first position and a second position;
based on the identified orientation being the first position, receiving a PC version of a web page associated with the PC version of the website from a server that provides the PC version of the website based on a URL for the PC version of the website, and
displaying the received PC version of the web page in the display through the web browser
based on the identified orientation being the second position,
receiving a mobile version of the web page associated with a mobile version of the website from a server that provides the mobile version of the website based on a URL for the mobile version of the website stored in the table in association with the URL for the PC version of the website, and displaying the received mobile version of the web page in the display through the web browser; and based on the URL for the mobile version of the website corresponding to the user command not being present in the pre-stored URL information and the identified orientation being the second position:

receiving the PC version of the web page from the server that provides the PC version of the website based on the URL for the PC version of the website, changing a size of scale of the received PC version of the web page based on a horizontal resolution of the display in the second position, and displaying the size changed scaled PC version of the web page in the display in the second position through the web browser.

12. The recording medium of claim 11, wherein the method further comprises based on the identified orientation being the second position, identifying whether the URL for the mobile version of the website corresponding to the user command is present in the pre-stored URL information.

13. The recording medium of claim 11, wherein the method further comprises, based on the orientation of the display being changed from the first position to the second position while the received PC version of the web page is being displayed in the display through the web browser, receiving the mobile version of the web page from the server that provides the mobile version of the website based on the URL for the mobile version of the website, and displaying the received mobile version of the web page in the display in the second position through the web browser.

14. The recording medium of claim 11, wherein the user command includes at least one from among a user command for executing the web browser, a user command for executing a URL input to an address window of the web browser, or a user command for selecting a hyperlink that is included in a web page that is displayed in the web browser.

15. The recording medium of claim 11, wherein the first position is a landscape position, and wherein the second position is a portrait position.

16. The display apparatus of claim 1, further comprising a sensor, wherein the at least one processor being configured to identify the orientation of the display based on sensor information received from the sensor.

17. The method of claim 6, wherein the identifying the orientation of the display includes receiving sensor information from a sensor.

* * * * *